May 23, 1972  A. SARGEANT  3,664,600
INERTIA REELS FOR SAFETY BELTS
Filed Sept. 11, 1969  2 Sheets-Sheet 1
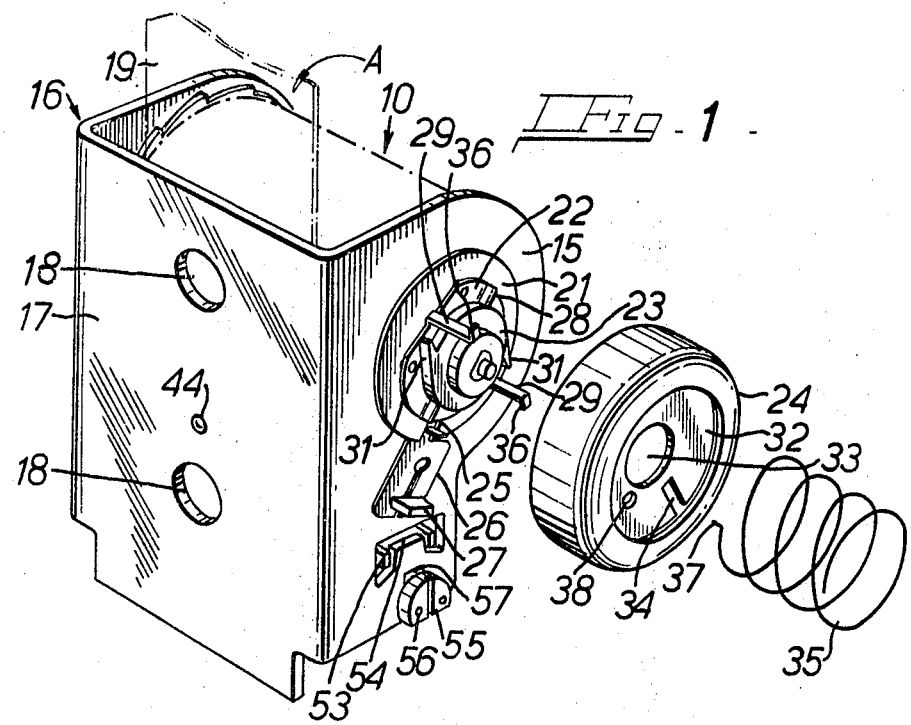
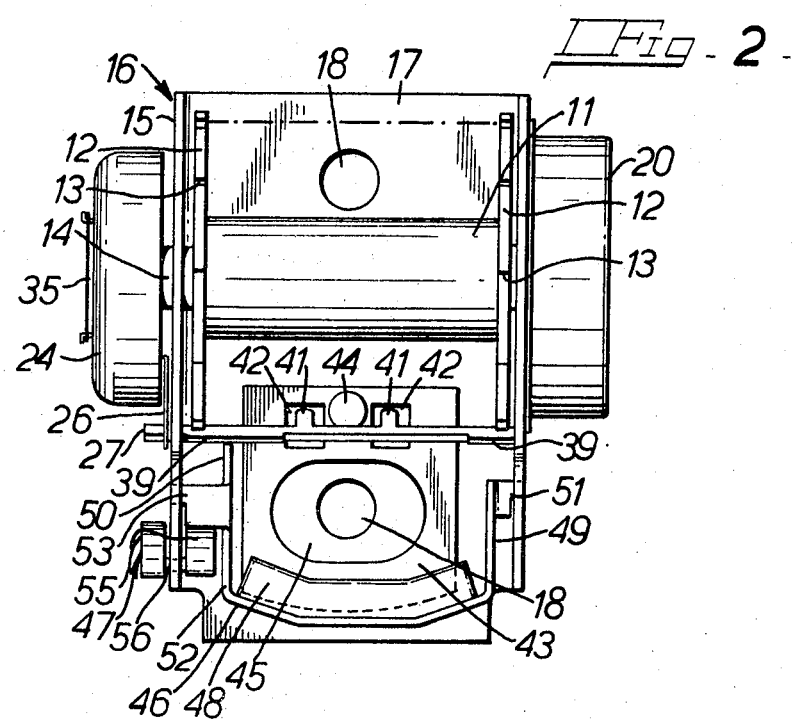

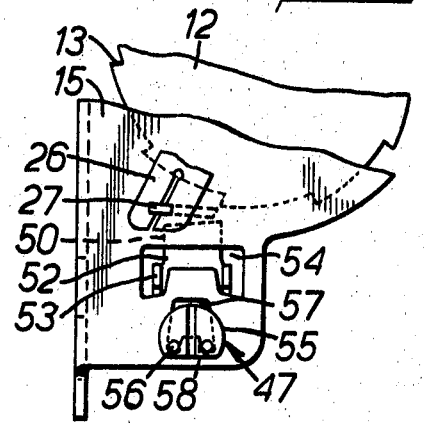
FIG-3-
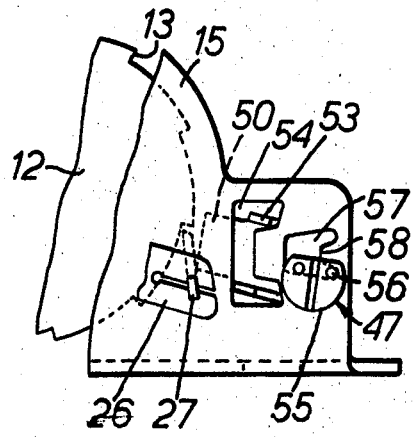
FIG-4-

United States Patent Office 3,664,600
Patented May 23, 1972

3,664,600
INERTIA REELS FOR SAFETY BELTS
Archibald Sargeant, Bognor Regis, England, assignor to Wingard Limited, Chichester, Sussex, England
Filed Sept. 11, 1969, Ser. No. 857,172
Claims priority, application Great Britain, Sept. 12, 1968, 43,357/68
Int. Cl. A62b 35/00
U.S. Cl. 242—107.4                        5 Claims

ABSTRACT OF THE DISCLOSURE

A spring-loaded reel for a vehicle safety belt incorporates an inertia member which is sensitive to a lateral tilt on lateral acceleration of the vehicle and activates a pawl and ratchet mechanism for temporarily locking the reel. A pivoted block permanently jams the inertia member in the locked position when the vehicle tilt exceeds a predetermined value.

---

This invention relates to improvements in inertia reels for safety belts.

Safety harness is provided in vehicles in order to hold a passenger to his seat when the vehicle decelerates or changes direction. In some types of harness, one end of a strap or belt forming part of the harness is wound onto a reel which is spring loaded to wind up the belt. In normal circumstances the wearer of the belt is able to move in his seat, the reel allowing the belt to be unwound under tension, then rewinding the belt when it is slack. In abnormal circumstances such as a collision, the reel must be able to lock itself against belt withdrawal in order to hold the belt wearer in his seat.

There are two main types of locking mechanism for reels. One type utilises an inertia member which is sensitive to sudden acceleration in the rate of belt withdrawal and which activates a reel locking member when the rate of belt withdrawal exceeds a predetermined value. The other type utilises an inertia member which is sensitive to a sudden change in movement of the vehicle and causes the reel to lock, when, for example, the vehicle is rapidly decelerated or changes direction even if the belt wearer does not move relative to the vehicle. Usually the reel unlocks itself when conditions return to normal.

Neither of these locking mechanisms is specifically activated by the vehicle rolling about a longitudinal axis. If a vehicle rolls laterally, due to a drastic change of steering direction, or rolls down a banking or a hill, it is very desirable that an occupant is permanently and firmly secured by the safety belt. To achieve this the reel should remain locked when the vehicle is the correct way up during the roll cycle.

Ideally the reel should lock automatically when the vehicle experiences a lateral tilt or a lateral acceleration above predetermined minimum values and then be able to unlock itself if these conditions do not exceed intermediate values. Whenever the vehicle experiences a lateral tilt which might lead to the vehicle rolling over, then the reel should lock irreversibly. The conditions that would lead to permanent locking of the reel, would almost certainly lead to considerable damage to the vehicle and to such a strain on the safety belt that it should be replaced. The permanent locking of the reel acts as an obvious warning to a subsequent user that the belt has been used in an accident situation. This prevents re-installation of strained belt assemblies which are agreed to be a totally unacceptable practice.

According to our invention a spring loaded reel adapted to be fitted to a vehicle for retracting a safety belt, incorporates means for locking the reel against belt withdrawal specifically when the vehicle experiences a lateral tilt or a lateral acceleration above predetermined minimum values. Preferably the locking means is adapted to lock the reel temporarily in response to a lateral tilt or lateral acceleration below predetermined intermediate values and is adapted to lock the reel permanently in response to a lateral tilt above this intermediate value.

A spring loaded reel according to our invention may be fitted with locking means sensitive to acceleration in belt withdrawal and with locking means sensitive to a longitudinal acceleration or a longitudinal tilt of the vehicle.

One embodiment of a spring-loaded reel according to our invention is illustrated by way of example in the accompanying drawings in which:

FIG. 1 is a partially exploded, perspective side view of the reel,
FIG. 2 is a plan view of the reel,
FIG. 3 is a partial side view of the reel in its normal condition, and
FIG. 4 is the view of FIG. 3 turned through 90 degrees showing the reel in its permanently locked condition.

The reel 10 comprises a hub 11 having a disc 12 at each end, the periphery of each disc being serrated to form ratchet teeth 13 so that the discs 12 serve not only as guides for the belt wound on to the hub 11 but also as part of the reel locking mechanism. The hub 11 is keyed onto a spindle 14 each end of which is rotatably mounted in an upstanding side flange 15 of an elongated channel section bracket 16. The spindle 14 is mounted at one end of the bracket 16 and at this end the flanges 15 are contoured to the diameter of the ratchet discs 12. The base 17 of the bracket 16 is formed with two holes 18 for bolts or screws which are adapted to fasten the bracket to the base of a pillar of a motor vehicle, the bracket being fastened vertically with the reel spindle 14 parallel to the longitudinal axis of the vehicle and with the reel uppermost so that the free end of the belt 19 is directed upwardly.

The reel spindle 14 projects through both side flanges 15. The spring for biasing the reel in the direction of belt retraction is mounted on one end of the spindle 14 and is contained in a housing 20. On the other end of the spindle 14 is mounted an inertia mechanism sensitive to acceleration of reel rotation in the direction of belt withdrawal. This belt sensitive mechanism comprises the following components mounted successively on the spindle 14 from the flange 15 outwards; a clutch plate 21, a clutch driver 22, a cam 23 and a flywheel 24.

The clutch plate 21 is a disc which has a clearance fit on the spindle 14 and which has a slot 25 in its periphery engaging with a lever 26 attached to a reel locking member 27.

The clutch driver 22 is a smaller annular disc which is free to move axially on the spindle 14. It is formed with a diametrical ridge 28 whose face in the direction of belt retraction (shown in FIG. 1 by arrow A) is perpendicular to the disc whereas the trailing face is inclined. Two arms 29 project perpendicularly outwards from the clutch driver 22 at the ends of a diameter normal to the ridge 28. The inner surface of the cam 23, which is a press fit on the spindle 14, is formed with a groove complementary in shape to the ridge 28 and the periphery of the cam 23 is formed with two teeth 31 whose leading edges face in the direction of belt withdrawal. Therefore, when the reel 10 rotates to retract the belt 19, the groove in the cam 23 carries the clutch driver 22 with the cam 23 but when the belt is withdrawn, the cam 23 can ride over the clutch driver 22 until the teeth 31 engage the arms 29.

The flywheel 24 is a relatively heavy cup shaped metal pressing having a recessed base 32 which is provided with a central opening 33 registering with the spindle 14 and with two diametrically opposed openings 34 registering with the two arms 29 of the clutch driver 22. A light spring 35 is fitted between the cranked ends 36 of the arms 29 and the base 32 of the flywheel 24. The inner end 37 of the spring 35 is cranked and is located in a small hole 38 in the base 32 of the flywheel 24 to prevent the spring rotating. The spring 35 serves to axially couple the flywheel 24 and the clutch driver 22 and also to hold the flywheel onto the spindle 14. In a modification (not shown) the end of the spindle 14 is fitted with a washer and circlip to retain the flywheel 24 more positively. When the inertia mechanism is assmbled the cup part of the flywheel 24 encloses the clutch plate 21, the clutch drives 22 and the cam 23.

During the belt withdrawal, the cam 23 rotates with the reel spindle 14 and carries the clutch driver 22 around with it, and the arms 29 of the clutch driver rotate the flywheel 24. At constant reel speeds the whole assembly rotates as one and the clutch driver 22 is prevented from contacting the clutch plate 21 by the spring 35. If rotation of the reel is accelerated, the flywheel 24 lags causing the clutch driver 22 to lag behind the cam 23. In this event the inclined face of the groove in the cam 23 rides over the inclined face of the ridge 28 causing the clutch driver 22 to move inwardly and engage the clutch plate 21; when the clutch plate 21 rotates in the direction of belt withdrawal it activates the locking members 27 via the lever 26. The mating surfaces of the clutch driver and the clutch plate may be provided with complementary formations to improve frictional contact and additionally the surface of the clutch plate may be coated with a resin.

The locking member 27 is a bar mounted below the ratchet discs 12 of the reel 10 in slots in the side flanges 15 of the bracket 16. The locking member 27 has two outwardly projecting pawls 39 which are adapted to engage the ratchet teeth 13 when the bar is rocked towards the reel 10. Once the pawls 39 have engaged the ratchet teeth 13, tension on the belt will keep the pawls engaged and the reel locked. When the tension is released the reel is free to retract the belt, the pawls 39 riding over the teeth 13. In a modification (not shown) a light spring is fitted to the locking member 27 to bias it away from the ratchet teeth 13.

The locking member 27 is also provided with a pair of inwardly projecting lugs 41 which engage in holes 42 in a bob weight 43 that, with the locking member, forms a second means for locking the reel 10, this locking means being sensitive to a longitudinal acceleration or a longitudinal tilt of the vehicle. The bob weight 43 is a flat plate that is pivoted about a rivet 44 set in the base 17 of the bracket 16 substantially in line with the locking member 27. The pivot point in the bob weight 43 is at the centre of the upper side between the two holes 42 which engage the lugs 41 so that the bob weight hangs against the base of the bracket 16 and is free to swing like a pendulum. A central portion 45 of the bob weight 43 is cut away to allow the bob weight to swing without fouling the head of the bolt or screw which is adapted to fasten the bracket to the vehicle.

Normally the bob weight 43 hangs centrally in the bracket but on acceleration of the vehicle, it swings to one side and the upper edge of one of the holes 42 exerts a downwards force on its corresponding lug 41 thus rocking the locking member 27 into its locking position. Similarly the bob weight 43 will lock the reel if the vehicle should climb or descend a steep hill or if the vehicle should be otherwise tilted longitudinally. The reel will remain locked while the belt is under tension or while locking conditions exist but when conditions return to normal, the reel will be free to pay out or retract the belt.

A third reel locking mechanism which is sensitive to lateral tilting and lateral accelerations of the vehicle comprises an actuating member 46 and a locking block 47, the actuating member 46 acting on the locking member 27 to lock the reel 10 and the locking block 47 permanently holding the actuating member 46 in the locked position when incipient rolling conditions are reached.

The actuating member 46 is a flat metal strip formed into a U-shaped frame and having a metal weight 48 riveted on the inside of the base of the U. The end of one arm 49 of the actuating member 46 is provided with a single outwardly cranked lug 51 while the other arm 52 is provided with a pair of outwardly cranked lugs 53 separated by the width of the strip. The free ends of the lugs 51, 53 are reduced and are mounted in the side flanges 15 of the bracket 16 so that the actuating member 46 can pivot about an axis parallel to the reel spindle 14. The pair of lugs 53 are mounted in a downwardly facing U-shaped slot 54, each lug resting in one of the arms of the U. Above these lugs 53 the actuating member is provided with an upwardly projecting extension 50 on which the locking member 27 rests when in the unloaded condition.

In operation a lateral tilt or lateral acceleration of the vehicle will cause the actuating member 46 to swing away or towards the base 17 of the bracket 16. In either case the extension 50 of the actuating member will cause the locking member 27 to rock into engagement with the ratchet teeth 13. When vehicle conditions return to normal the actuating member 46 will release the locking member 27 unless the locking block 47 has been activated.

The locking block 47 comprises two identical discs 55 each having the shape of the major segment of a circle. The discs 55 are held apart by two pins 56 spaced along the chord of the segment. The locking block 47 is pivoted on these pins 56 in a trapezoidal opening 57 just below the U-shaped slot 54 in which the pivot lugs 53 of the actuating member 46 are mounted. Under normal driving conditions the locking block 47 rests with its pivot pins 56 in the two lower corners of the opening 57, as shown in FIG. 3, and a raised section 58 on the lower side of the opening 57 projects between the two pins 56. When the vehicle is tilted through an angle greater than a predetermined one, the locking block 47 pivots about one of the pins 56 so that both pins lie on a normally upright side of the opening 57 as shown in FIG. 4. In moving to this position the inner disc 55 jams under the wider part of one of the pivot lugs 53 of the actuating member 46, thus holding the extension 50 in the locked position. Even if the vehicle returns to its vertical position, the interaction of the locking block 47 and the actuating member 46 prevent either component returning to its normal position; they can only be released manually. Therefore the actuating member 46 will reversibly lock the reel for degrees of lateral tilt below a predetermined value but when this value has been exceeded, the locking block 47 will pivot and lock the reel irreversibly. It will be understood that by adjusting the geometry and loadings on the mechanism, the conditions which trigger the actuating member 46 initially and which trigger the locking block 47 can be altered as desired.

The reel will normally be fitted with a cover, not shown in the drawings, so that when the locking block 47 has been activated in an accident situation the cover will have to be removed before the locking block can be reset.

I claim:

1. A reel assembly which is adapted to be fitted to a vehicle for retracting a safety belt, said assembly comprising a channel-shaped bracket adapted to be fitted to the vehicle; a reel journalled in the side flanges of the bracket; spring means biasing the reel in the direction of belt retraction; reel locking means comprising ratchet teeth rotating with the reel and a pawl bar pivotally mounted in the side flanges of the bracket; an actuating member for the locking means comprising a U-shaped frame, an outwardly cranked lug at the end of each arm of the frame, each of said lugs being pivotally mounted in one of the side flanges of the bracket, and an extension of one of the arms of the frame which is adapted to actuate the pawl bar when a force on the frame causes it to swing from its position of rest, the frame returning to its rest position and unlocking the reel when the force ceases to act; and an inertia member mounted in the bracket to be displaceable from a rest position to an operative position in response to said force whenever said force exceeds a predetermined value, said inertia member being constructed and arranged that in its operative position it engages with and holds the frame in its actuating position so that it is unable to return to its rest position when the force ceases to act.

2. A reel assembly as in claim 1 wherein the extended arm of the U-shaped frame is provided with a pair of outwardly-cranked, spaced, pivot lugs and the inertia member is provided with two spaced over-centre pins on which the member is pivotally mounted, the pins extending through the side flange of bracket adjacent the pair of pivot lugs whereby when the inertia member experiences a tilting force below the predetermined value it lies between the spaced lugs but when the force on the member exceeds this value it pivots on one of its pins to engage one of the lugs, this engagement holding the extended arm of the frame in locking relationship with the pawl bar.

3. A reel assembly as in claim 1 further comprising a second actuating member for the locking means and being responsive to a force acting in one of two opposite directions normal to the direction of the forces to which the first actuating member is responsive, said second actuating member being automatically reversible in its movement.

4. A reel assembly as in claim 3 wherein said second actuating member comprises a bob-weight pivotally mounted about an axis normal to the axis of the reel and adapted to actuate the locking means when caused to swing from its position of rest.

5. A reel assembly as in claim 3 further comprising a third actuating member for the locking means, said member being responsive to acceleration in the rate of belt withdrawal.

References Cited

UNITED STATES PATENTS

| | | | |
|---|---|---|---|
| 3,203,641 | 8/1965 | McFarlane et al. | 242—107.4 |
| 3,226,053 | 12/1965 | Petty | 242—107.4 |
| 3,240,510 | 3/1966 | Spouge | 242—107.4 X |
| 3,446,454 | 3/1969 | Kovacs et al. | 242—107.4 |
| 3,489,367 | 1/1970 | Kovacs et al. | 242—107.4 |
| 3,495,786 | 2/1970 | Hemens | 242—102.4 |
| 3,508,720 | 4/1970 | Kell | 242—107.4 |

STANLEY N. GILREATH, Primary Examiner

W. H. SCHROEDER, Assistant Examiner